US006476827B1

(12) United States Patent
Porter (10) Patent No.: US 6,476,827 B1
(45) Date of Patent: Nov. 5, 2002

(54) METHOD AND APPARATUS FOR CREATING AND MAINTAINING A SCRAPBOOK OF INFORMATION PAGES

(75) Inventor: Swain W. Porter, Kirkland, WA (US)

(73) Assignee: Xoucin, Inc., Kirkland, WA (US)

( * ) Notice: Subject to any disclaimer, the term of this patent is extended or adjusted under 35 U.S.C. 154(b) by 0 days.

(21) Appl. No.: 09/387,080

(22) Filed: Aug. 31, 1999

(51) Int. Cl.[7] ............................. G06F 3/00; G06F 13/00
(52) U.S. Cl. ....................................... 345/738; 345/835
(58) Field of Search ................................ 345/700, 733, 345/748, 749, 764, 765, 769, 772, 835, 839, 738; 709/201, 203, 217, 219

(56) References Cited

U.S. PATENT DOCUMENTS

| | | | | |
|---|---|---|---|---|
| 5,757,372 A | * | 5/1998 | Krause et al. | 345/840 |
| 5,821,927 A | * | 10/1998 | Gong | 345/822 |
| 5,892,908 A | * | 4/1999 | Hughes et al. | 709/250 |
| 5,917,491 A | * | 6/1999 | Bauersfeld | 345/810 |
| 6,100,890 A | * | 8/2000 | Bates et al. | 345/826 |
| 6,208,995 B1 | * | 3/2001 | Himmel et al. | 706/6 |
| 6,212,522 B1 | * | 4/2001 | Himmel et al. | 707/10 |
| 6,275,862 B1 | * | 8/2001 | Sharma et al. | 707/10 |
| 6,314,423 B1 | * | 11/2001 | Himmel et al. | 707/10 |
| 6,334,145 B1 | * | 12/2001 | Adams et al. | 345/650 |

* cited by examiner

Primary Examiner—Crescelle N. dela Torre
(74) Attorney, Agent, or Firm—Schwabe, Williamson and Wyatt, P.C.

(57) ABSTRACT

A "state" icon having a plurality of manifestations corresponding to a plurality of states associated with saving a copy of a current information page being browsed is automatically displayed for a user. The "state" icon denotes to the user whether the information page or other variants have been previously saved. A "single click" icon is employed to facilitate saving a copy of the current information page being browsed for a user. The saving is accomplished without requiring further interaction with the user. A "remote save" mechanism is provided to facilitate automatic retrieval of one or more information pages in accordance with one or more specified user conditions, and saving of the retrieved information pages in a repository. The information pages are retrieved and saved without requiring them to be first downloaded to the user's system. Selected ones of these and other features are provided to different embodiments to enhance a user's ability to create and maintain a "scrapbook" of information pages that are of interest the user.

31 Claims, 8 Drawing Sheets

BROWSER

FIG. 3a

RESPOSITORY MANAGER

METHOD AND APPARATUS FOR CREATING AND MAINTAINING A SCRAPBOOK OF INFORMATION PAGES

BACKGROUND OF THE INVENTION

1. Field of the Invention

The present invention relates to the field of information systems. More specifically, the present invention relates to the creation and maintenance of a scrapbook of information pages.

2. Background Information

With advances in computer, networking and telecommunication technologies, increasingly computers are being networked together. Information have become readily available with a few mouse clicks, from private data servers within an enterprise network to public data servers in public data networks, such as the world wide web (also referred to as web servers or web sites) accessible through the Internet.

Under the prior art, most browsers offer assistance to the user in keeping track the various sites he has visited, bookmarking his favorite sites and so forth. However, as far as saving and collecting a "scrapbook" of his favorite information pages, only the conventional "save" function, which requires more than one mouse click, is available to the user. Additionally, an information page must be downloaded before it can be saved, consuming the valuable and often limited communication bandwidth of the client. Furthermore, no assistance is offered on organizing the saved pages.

Today, many portals (such as Yahoo, Hotmail, and so forth) offer the service of emailing a user a list of annotated links in accordance with a set of preferences indicated by the user. However, these services typically suffer from the disadvantage that the user may choose from a limited set of categories offered by the service (such as news, sports and so forth). Moreover, each list is supplier or site bounded (e.g. a list from MSNBC, a list from Wired Magazine, and so forth). The linked documents or pages must be retrieved from their sources at the time the user wants to read them. Pre-fetching these documents or pages are not possible. A user may save these emails or even organize them by their senders (MSNBC and so forth), but there is no mechanism to organize them by topics across providers (such as all the sport items from MSNBC and CNN).

Thus, an improved approach to creating and maintain a scrapbook of information page is desired.

SUMMARY OF THE INVENTION

In accordance with a first aspect of the present invention, a "save state" icon having a plurality of manifestations corresponding to a plurality of states associated with saving a copy of a current information page being browsed is automatically displayed for a user. The "save state" icon denotes to the user whether the information page or other variants have been previously saved.

In accordance with another aspect, a "single click save" icon is employed to facilitate saving a copy of the current information page being browsed for a user. The saving is accomplished without requiring further interaction with the user.

In accordance with yet another aspect, a "remote save" mechanism is provided to facilitate automatic retrieval of one or more information pages in accordance with one or more specified user conditions, and saving of the retrieved information pages in a remote repository. The information pages are retrieved and saved without requiring them to be first downloaded to the user's system.

Selected ones of these and other features are provided to different embodiments to enhance a user's ability to create and maintain a scrapbook of information pages that are of interest the user.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as graphical user interfaces, command menu, task bars, icons, and so forth, commonly employed by those skilled in the art to convey the substance of their work to others skilled in the art. Parts of the description will be presented in terms of operations performed by a computer system, using terms such as receiving, determining, retrieving, saving, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
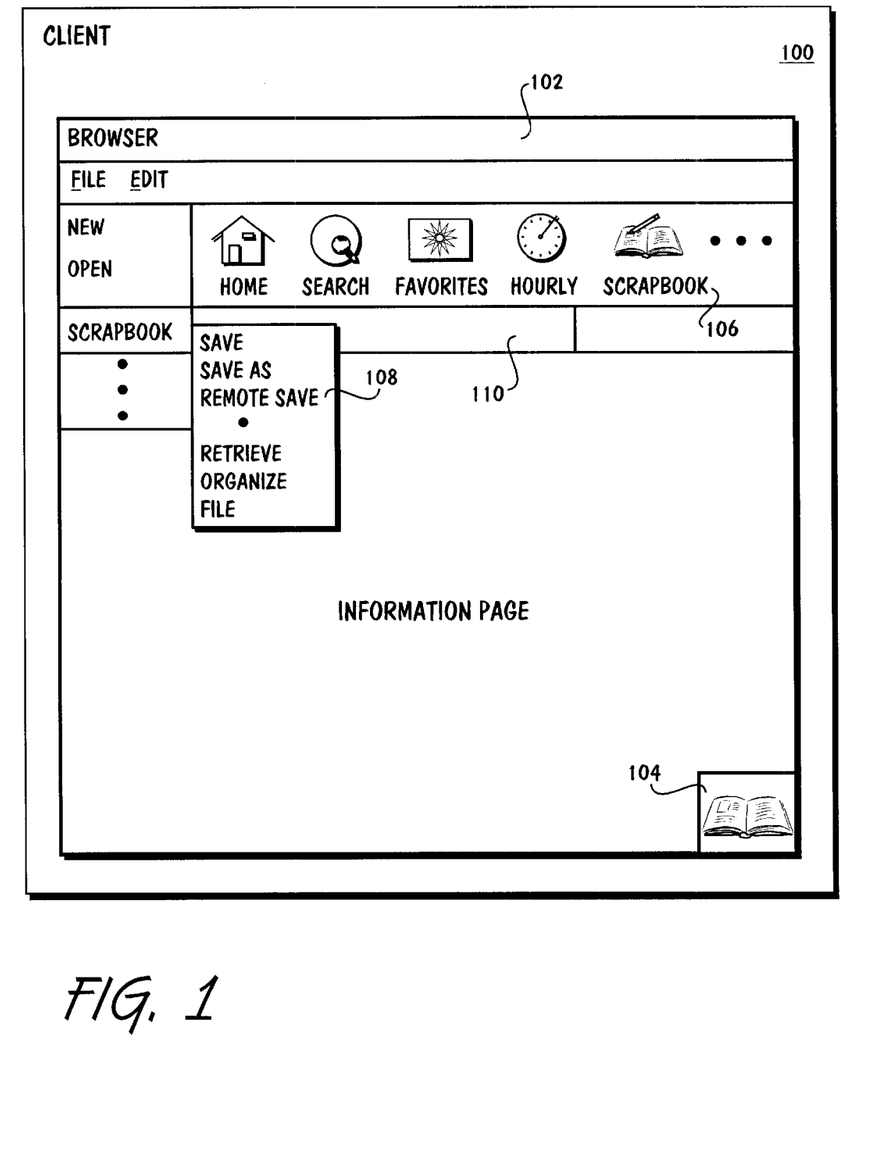
FIG. 1 illustrates an overview of the present invention, in accordance with one embodiment.

Referring now to FIG. 1, wherein a diagram illustrating an overview of the present invention in accordance with one embodiment is shown. As illustrated, in accordance with the present invention, client computer 100 is provided with enhanced browser 102 incorporated with the teachings of the present invention. More specifically, browser 102 is equipped with an enhanced graphical user interface that includes, in addition to conventional features (such as address field 110 to facilitate entry of e.g. a uniform resource locator (URL)), a number of novel features for assisting a user in creating and maintaining a scrapbook of information pages. For the illustrated embodiment, these features include "save state" icon 104, "single click save" icon 106, and "remote save" mechanism 108. Briefly, "save state" icon 104 may be manifested in one of a number of ways corresponding to a number of states associated with saving a copy of a current information page being browsed. The "save state" icon denotes to the user whether the information page or other variants have been previously saved. "Single click" icon 106 enables the user to save a copy of the current information page being browsed on client 100 with a single click of the icon. Unlike the prior art "save" command, further interaction with the user is not required. "Remote save" mechanism 108 automatic retrieves one or more information pages in accordance with one or more user specified criteria, and saves the retrieved information pages in a remote repository. The information pages are retrieved and saved without requiring them to be first downloaded to the user's system.

Figure 2:
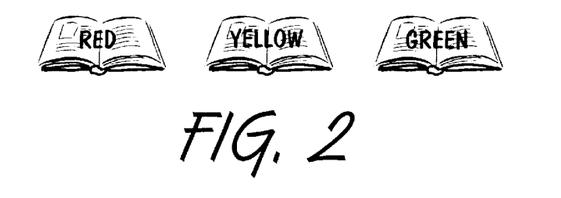
FIG. 2 illustrates the "save state" icon of the present invention in further detail, in accordance with one embodiment.

FIG. 2 illustrates the various ways "save state" icon 104 may be manifested:, in accordance with one embodiment. As illustrated, "save state" icon 104 may be manifested in at least one of the three ways denoting one of three states associated with saving a current information page being browsed. Under the first way, "save state" icon 104 is presented in the form of a graphical image of a red scrapbook, denoting that neither the current information page being browsed nor any of its variants have been previously saved. Under the second way, "save state" icon 104 is presented in the form of a graphical image of a yellow scrapbook, denoting that at least one earlier version of the current information page being browsed has been previously saved. Under the third way, "save state" icon 104 is presented in the form of a graphical image of a green scrapbook, denoting that the current information page being browsed has been previously saved.

For the illustrated embodiment, "save state" icon 104 is automatically displayed, concurrent with the display of the current information page. The "save state" is dynamically determined. In alternate embodiments, more or less states, more or less or different colors, as well as other graphical or non-graphical representations may be employed instead. The display of icon 104 may be made on-demand as opposed to automatic also.

Figure 3A:
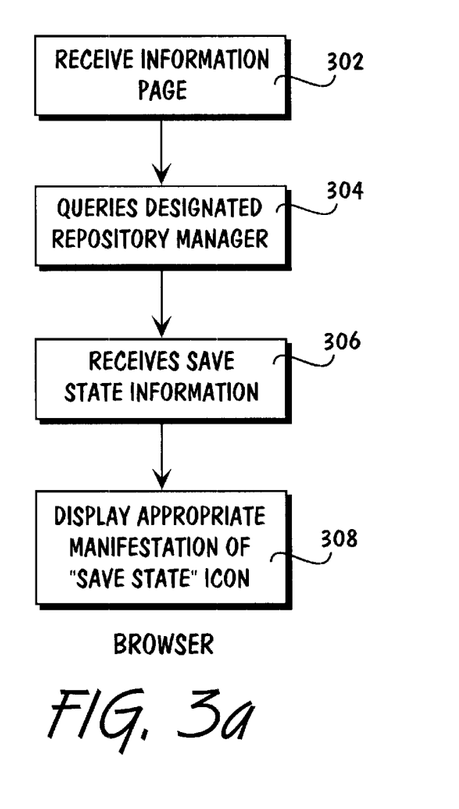
FIGS. 3a–3b illustrate a method of operation including the "save state" icon of the present invention, in accordance with one embodiment.
Figure 3B:
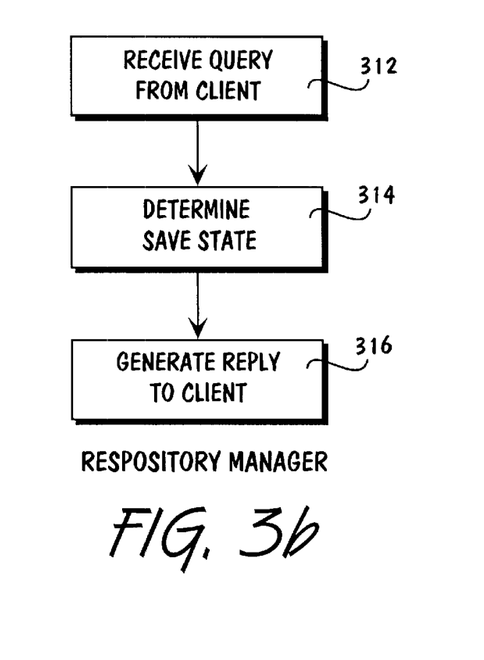

FIGS. 3a–3b illustrate a method of operation including the employment of "save state" icon 104, in accordance with one embodiment. As illustrated in FIG. 3a, at 302, an information page is received by browser 102. In response, at 304, browser 102 automatically queries a designated repository manager on the "save state" of the information page. Browser 102 includes as part of the query, the URL as well as the version information for the information page. At 306, browser 102 receives the "save state" determination from repository manager. At 308, browser 102 concurrently displays an appropriate manifestation of "save state" icon 104, depending on the response of the queried repository manager.

For the illustrated embodiment, the repository manager is disposed remotely managing a remote repository. In alternate embodiments, the repository manager may be disposed locally managing a local repository instead. In either case, the designation of the repository manager may be specified in any one of a number of known approaches to setting operating parameters for browser 102.

As illustrated in FIG. 3b, at 312, the repository manager receives the above described query from browser 102. At 314, in response to the query, the repository manager determines if the information page or at least one of its variants has been previously saved in its repository. For the illustrated embodiment, the repository manager maintains the URL and the associated version information for each information page saved. Accordingly, it makes the "save state" determination by comparing the URL and version information included in the query with the URL and version information it maintains. At 316, the repository manager generates a reply for browser. 102 informing browser 102 the result of its determination.

Thus, it can be seen a user may be advantageously briefed in real time, whether an information page being browsed or its variants have been previously saved.

Figure 4:
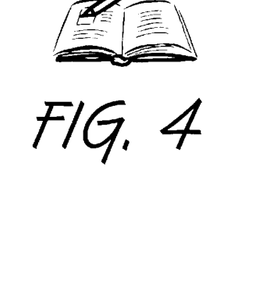
FIG. 4 illustrates the "one click save" icon of the present invention in further detail, in accordance with one embodiment.

FIG. 4 illustrates "one click save" icon 106, in accordance with one embodiment. As illustrated, "one click save" icon 106 is presented in the form of a graphical image of a pen writing into a scrapbook. For the illustrated embodiment, "one click save" icon 106 is displayed as an integral part of a "task bar" of browser 102. The inclusion is automatic unless a user has configured browser 102 to exclude the "one click save" icon 106 from the "task bar". In alternate embodiments, other display locations, as well as other graphical or non-graphical representations may be employed instead.

Figure 5A:
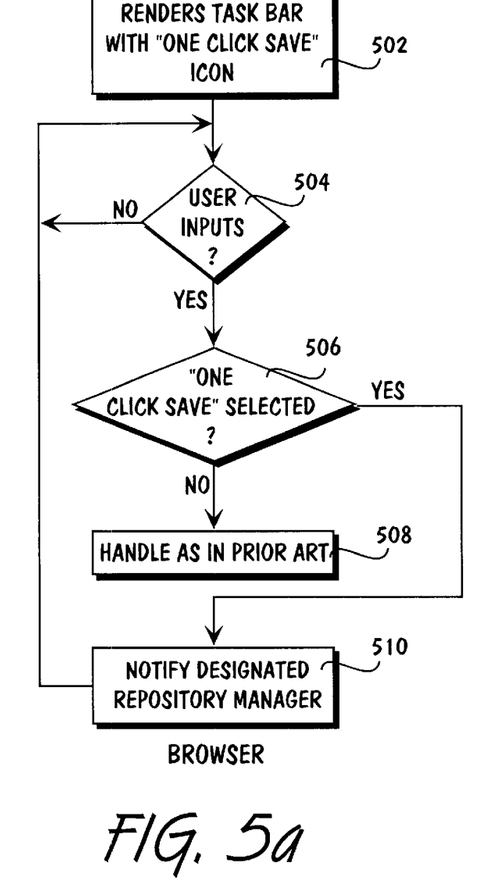
FIGS. 5a–5b illustrate a method of operation including the "one click save" icon of the present invention, in accordance with one embodiment.
Figure 5B:
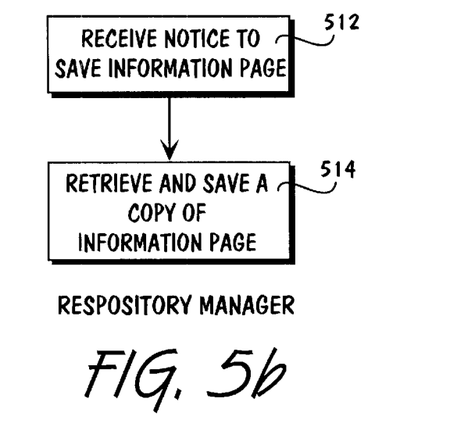

FIGS. 5a–5b illustrate a method of operation including the employment of "one click save" icon 106, in accordance with one embodiment. As illustrated in FIG. 5a, at 502, at program start-up, unless configured to exclude, browser 102 renders the initial display window with a task bar having "one click save" icon 106. At 504, browser 102 awaits user inputs. At 506, upon receipt of a user input, browser 102 determines if the user has selected "one click save" icon 106. If it's one of the conventional user inputs, browser 102 handles the conventional user input as in the prior art, 508. However, if the user has selected "one click save" icon 106, browser 102 notifies the designated repository manager, 510, to cause a copy of the current information page to be saved into the repository managed by the designated repository manager. In either case, upon processing the conventional user input, or causing a copy of the current information page to be saved, browser 102 returns to 504 to await further user inputs.

For the illustrated embodiment, the repository manager is disposed remotely managing a remote repository. Browser 102 includes with the notification, the URL for the information page. Browser 102 also includes a client identifier and the current date and time. The client identifier may be pre-established in any one of a number of approaches known in the art, including but not limited to how free email user identifiers are created. In alternate embodiments where the designated repository manager is local instead, browser 102 further includes one or more pointers to the local memory locations where the current information page can be found instead.

As illustrated in FIG. 5b, at 512, the repository manager receives the notice to save a copy of the current information page being browsed on client 100. At 514, in response to the notification, the repository manager retrieves a copy of the current information page (either from its source using the provided URL or from the local memory using the provided pointers), and saves the copy into its managed repository. As alluded to earlier, the repository manager creates a record and records the URL and the associated version information of the information page saved. For the illustrated embodiment, the repository manager also records the date and time, as well as the client identifier information.

In an alternate embodiment, the repository manager saves each information page in delta form employing a universal unique identifier (UUID). That is, each information page is given an UUID, a first of a series of related information pages is stored in its entirety as a base information page, and only the delta contents are stored for all subsequent variants of the information page. Storing source and object files in the above described manner is the subject of co-pending U.S. patent application, Ser. No. 09/177,443, filed Oct. 21, 1998, and titled User Centric Source Control.

Thus, it can be seen the current information page can be advantageously saved with a single mouse click, to further enhance a user's usage experience of browser 102.

Figure 6:
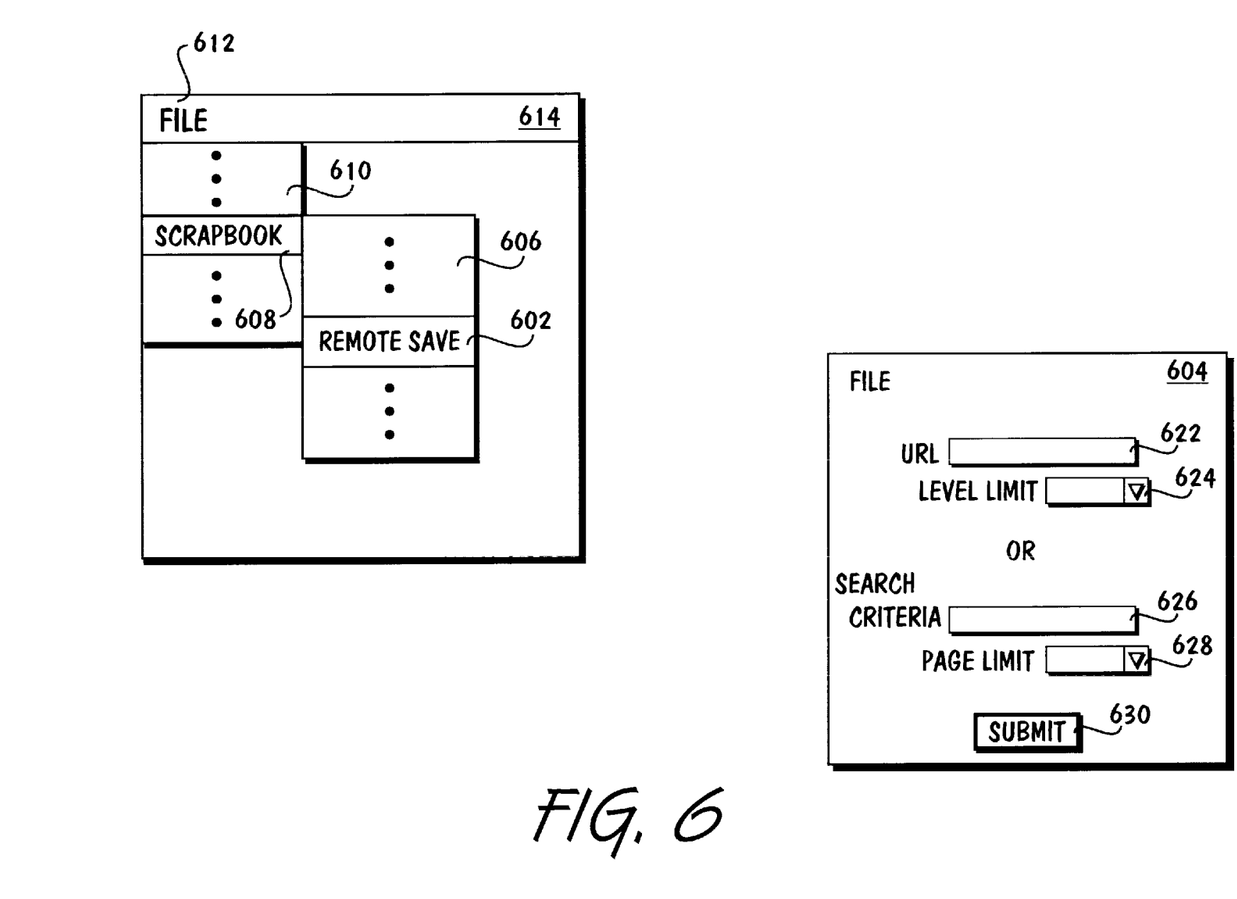
FIG. 6 illustrates the "remote save" mechanism of the present invention in further detail, in accordance with one embodiment.

FIG. 6 illustrates "remote save" mechanism 108, in accordance with one embodiment. As illustrated, "remote save" mechanism 108 includes "remote save" command 602 and its associated pop-up dialog 604. For the illustrated embodiment, "remote save" command 602 is incorporated as part of the expandable command menu 606 associated with "scrapbook" command 608, which itself is incorporated as part of the drop-down menu 610 associated with the "File" command 612 of built-in command menu 614. Pop-up dialog 604 is presented in response to the user's selection of "remote save" command 602, which is presented in response to the user's selection of "scrapbook" command 608 (presented in response to the user's section of the "File" command 612). Pop-up dialog 604 includes URL field 622 and level limit field 624 for the user to enter a URL and a level limit, search criteria field 626 and page limit field 628 for the user to enter one or more search criteria and a page limit instead. Pop-up dialog 604 further includes "submit" button 630 to submit the "remote save" command. A URL entered into URL field 622 denotes the first information page to be retrieved and saved. A level limit entered into level limit field 624 denotes how many additional linked information pages are also to be retrieved and saved (in terms of the maximum depth levels the corresponding links may be located). Search criteria entered into search criteria field 626 denote the types of information pages to be retrieved and saved. A page limit entered into page limit field 628 denotes how many of these information pages are to be retrieved and saved. The inclusion of these commands as an integral part of built-in command menu 614 is automatic unless a user has configured browser 102 to exclude "remove save" command 602 from expansion menu 606, or "scrapbook" command 608 from drop-down menu 610, or "File" command 612 from built-in command menu 614. In alternate embodiments, other forms of invocation, including but not limited to iconic representation in the task bar, may be employed instead.

Figures 7A, 7B:
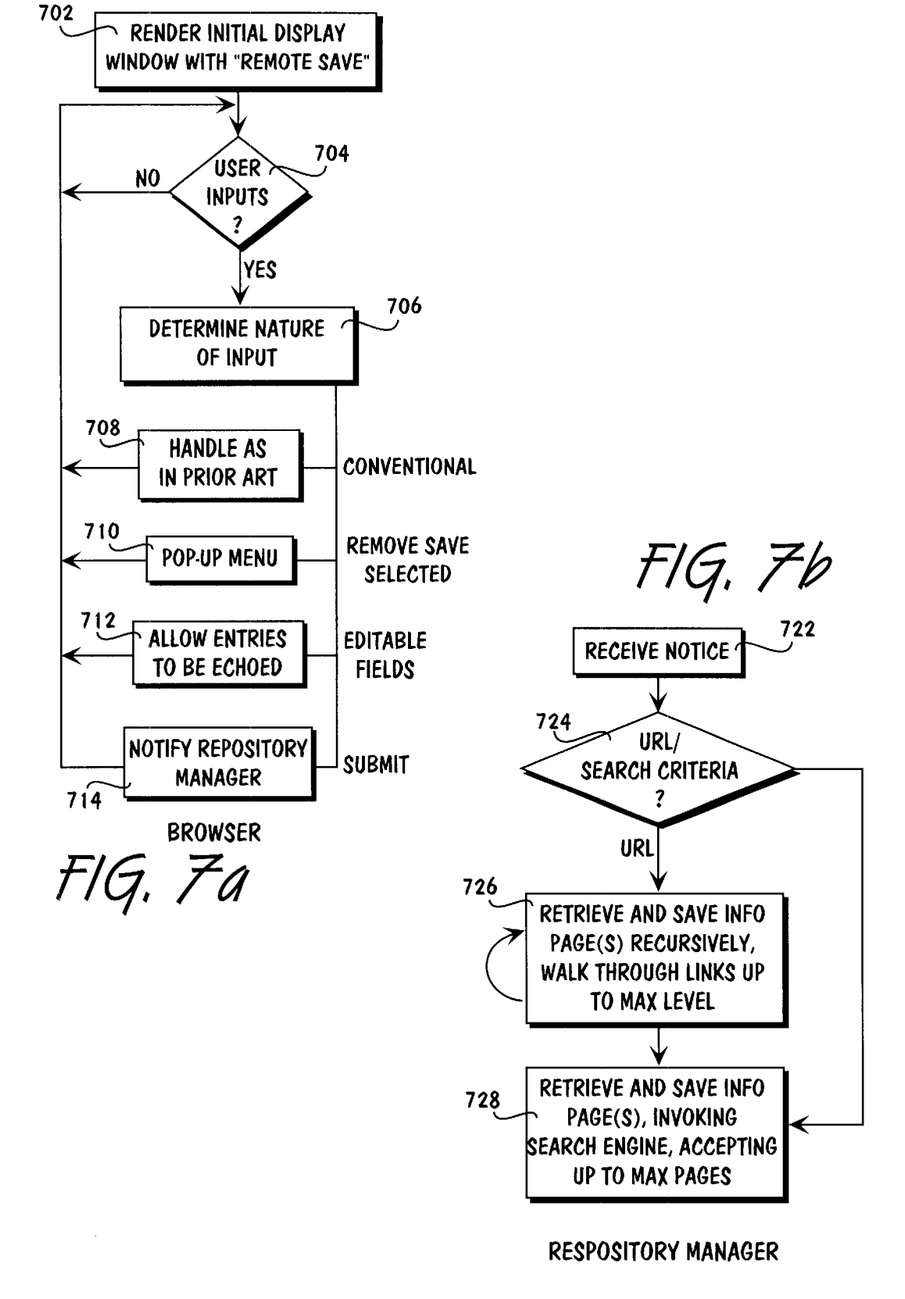
FIGS. 7a–7b illustrate a method of operation including the "remote save" mechanism of the present invention, in accordance with one embodiment.

FIGS. 7a–7b illustrate a method of operation including the employment of "remote save" mechanism 108, in accordance with one embodiment. As illustrated in FIG. 7a, at 702, at program start-up, unless configured to exclude or a local repository manager is designated, browser 102 renders the initial display window with built-in command menu 614 incorporated with "File" command 610 having "scrapbook" command 606, and ultimately "remote save" command 602. At 704, browser 102 awaits user inputs. At 706, upon receipt of a user input, browser 102 determines the nature of the user input. If it's one of the conventional user inputs, browser 102 handles the conventional user input as in the prior art, 708. However, if the user has selected "remote save" command 602, browser 102 responds with pop-up menu 604, 710. If the user has made entries into any one of the editable fields 622–628, browser 102 allows the entries to be "echoed" and displayed, 712. If the user has selected "submit" button 630, browser 102 notifies the designated repository manager, 714, to cause the specified information page or pages to be retrieved and saved into the remote repository managed by the remote repository manager. The information page or pages are retrieved and saved without requiring them to be first downloaded onto client 100. Upon processing the user input, including causing the specified information page(s) to be retrieved and saved in the described manner, browser 102 returns to 704 to await further user inputs.

For the illustrated embodiment, browser 102 includes with the notification the specified URL and level limit or the specified search criteria and page limit. Similar to saving a current information page, browser 102 also includes a client identifier and the current date and time.

As illustrated in FIG. 7b, at 722, the repository manager receives the notice to save the specified information page or pages. At 724, the repository manager determines whether an URL (with level limit) or search criteria (with page limit) is included with the notification. If an URL (with level limit) is included with the notification, the repository manager retrieves the specified information page or pages, recursively walk through the links contained in each information page, up to the maximum depth specified by the level limit, 726. If search criteria (with page limit) are included with the notification, the repository manager retrieves the specified information page or pages (invoking any one of a number of search engines known in the art), limiting the number of pages returned to the page limit specified, 728. In like manner as the single page save, the repository manager creates a record for each page, and records the URL and the associated version information of the information page saved. For the illustrated embodiment, the repository manager also records for each page, the date and time, as well as the client identifier information.

Thus, it can be seen information pages can be advantageously pre-saved into a remote repository to reduce access time at viewing time, to further enhance a user's usage experience of browser 102.

Figure 8:
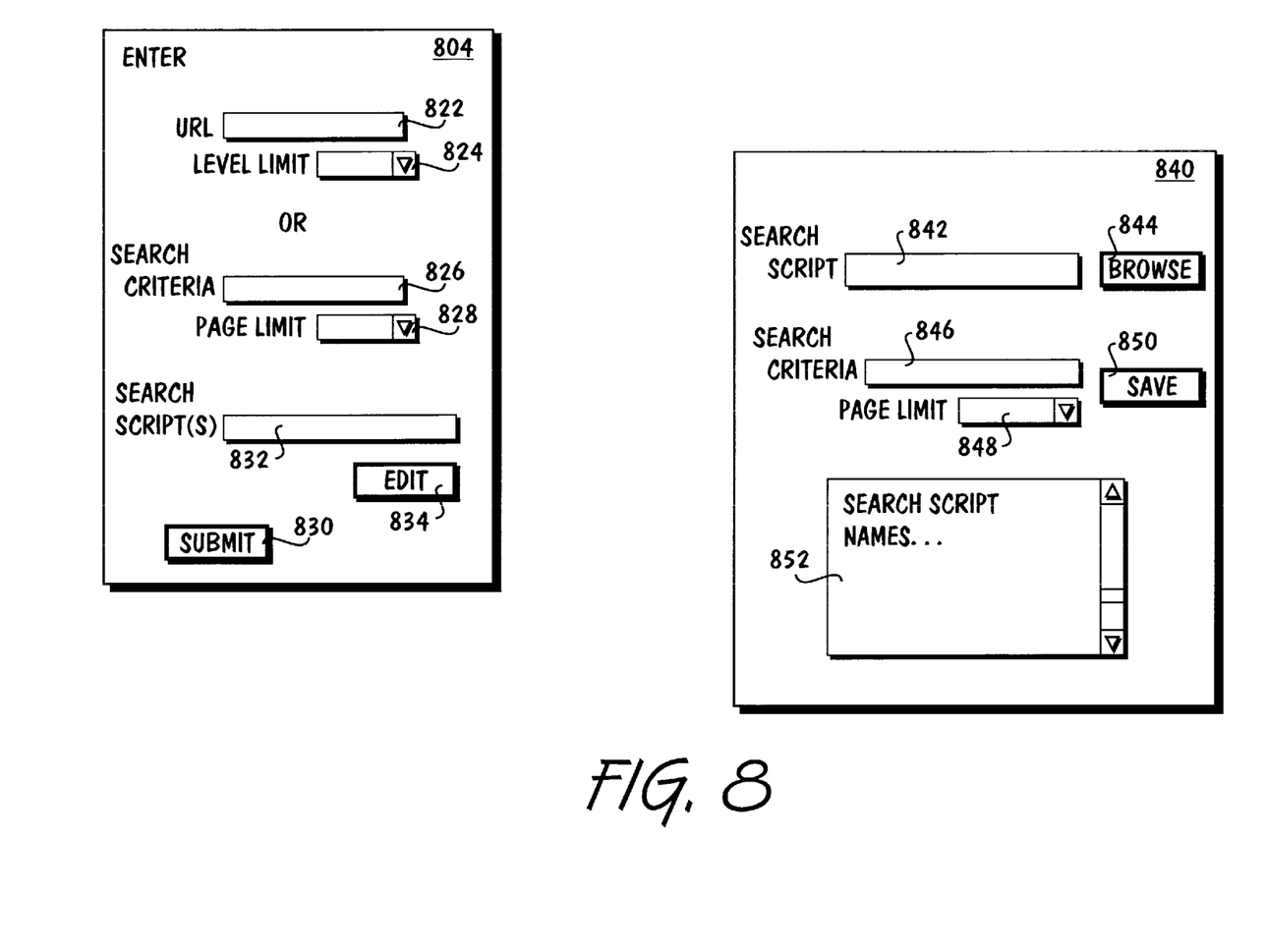
FIG. 8 illustrates an advanced version of the "remote save" mechanism of the present invention in further detail, in accordance with another embodiment.

FIG. 8 illustrates an advanced version of "remote save" mechanism 108, in accordance with another embodiment. Similar to the earlier described embodiment, the advanced version of "remote save" mechanism 108 also includes a pop-up dialog, 804. In one embodiment, pop-up dialog 804 is displayed in response to an "advance" button, additionally provided to the earlier described pop-up dialog 604 (not shown). In alternate embodiments, pop-up dialog 804 may simply replace pop-up dialog ,604, such that it is directly invoked through "remote save" command 602 of the expandable command menu 606 associated with "scrapbook" command 608. Regardless of the method of invocation, pop-up dialog, 804 is invocable only if browser 102 has not been configured to exclude the "remove save" mechanism.

As illustrated, in addition to URL field 822, level limit field 824, search criteria field 826, page limit field 828, and "submit" button 830, as described earlier for the first embodiment, pop-up dialog 804 further includes search script(s) field 832 and "edit" button 834. URL field 822, level limit field 824, search criteria field 826, and page limit field 828 all serve the same functions and handled in the same manner as described earlier. Search script(s) field 832 is used to facilitate entry of one or more search script names. Each named search script contains a set of search criteria. The search scripts enable a user to create different "sections" for his scrapbook, and pre-associate a set of search criteria for each of these sections. "Edit" button 834 is used to invoke "edit" pop-up dialog 840 for editing the search criteria of the search scripts. "Submit" button 830 also serves the same function as earlier described, except it is also used to indirectly submit one or more sets of search criteria through the submission of one or more search script names.

Thus, the operating logic associated with pop-up dialog 804 is substantially the same as the operating logic early described referencing FIG. 7a. That is, in addition to the functions earlier described, the operating logic associated with pop-up dialog 804 also causes pop-up dialog 840 to be displayed in response to the selection of "edit" button 834, and search criteria contained in the entered search scripts to be successively submitted to the remote repository manager in response to the selection of "submit" button 830 (if one or more search script names are entered in field 832).

Still referring to FIG. 8, "edit" pop-up dialog 840 includes search script field 842, search criteria field 846, page limit field 848, search script list 852, "save" button 850, and "browse" button 844. Search script field 842 is used to facilitate entry/display of the name of the current search script being edited. The name may have been entered through pop-up dialog 804 prior to the selection of "edit" button 834. Search criteria field 846 and page limit field 848 serve the same functions as the earlier described search criteria and page limit fields of pop-up dialog 604. Search script list 852 lists search scripts previously created and saved. The list is also used to facilitate selection of one of the listed search script to be the current search script for editing. "Save" button 850 causes the current search script to be saved, and "browse" button 844 causes search script list 852 to be displayed. For the illustrated embodiment, search script list 852 is initially hidden, and only displayed responsive to the selection "browse" button 844. In alternate embodiments, list 852 may be unconditionally displayed, without the employment of "browse" button 844.

Figure 9:
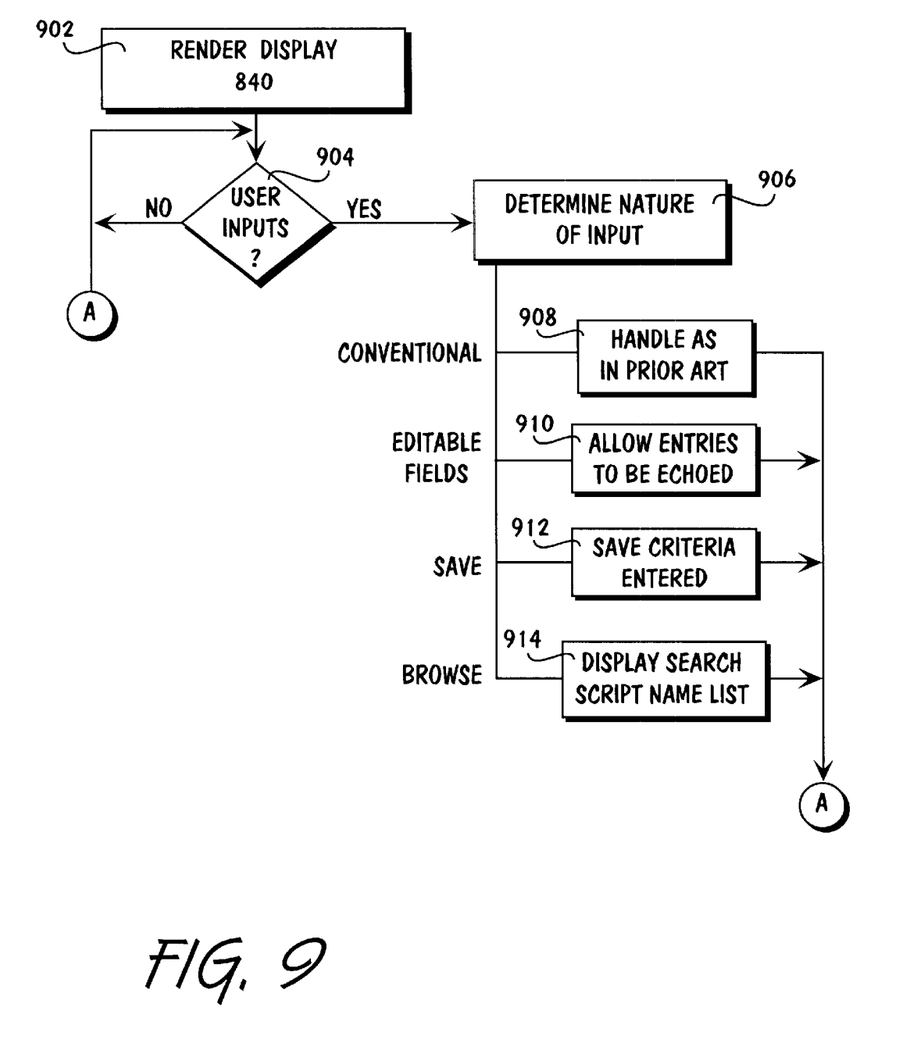
FIG. 9 illustrate a method of operation including the advanced version of the "remote save" mechanism of the present invention, in accordance with another embodiment.

FIG. 9 illustrates the operating logic associated with "edit" pop-up dialog 840 for a method of operation including the employment of the advanced version of "remote save" mechanism 108, in accordance with one embodiment. As illustrated at 902, browser 102 renders pop-up dialog 840. At 904, browser 102 awaits user inputs. At 906, upon receipt of a user input, browser 102 determines the nature of the user input. If it's one of the conventional user inputs, browser 102 handles the conventional user input as in the prior art, 908. However, if the user has made entries into any one of the editable fields 842–848, browser 102 allows the entries to be "echoed" and displayed, 910. If the user has selected "save" button 850, browser 102 saves the current search script, 912. If the user has selected "browse" button 844, browser 102 causes search script list 852 to be displayed, 914. Upon processing the user input, browser 102 returns to 904 to await further user inputs.

Thus, it can be seen information pages can be advantageously organized into sections of the scrapbook, and pre-saved into a remote repository, to further enhance a user's usage experience of browser 102.

While for ease of understanding, the above description refers to only one level of organization, i.e. sections of the scrapbook, as those skilled in the art will appreciate from the foregoing description, the search criteria association aspect of the present invention may be practiced with any number of the organization levels, e.g. volumes, chapters, sections, sub-sections and so-forth.

Returning briefly to FIG. 1, in addition to "remote save" 108, the "scrapbook" function of the present invention may also include other functions such as "save", "save as", "retrieve", "organize", "find" and so forth. "Save" and "save as" may be used to save information pages as prior art "save" and "save as" commands for saving files or emails. "Retrieve" may be used to retrieve a previously saved information page as prior art "open" commands for "opening a saved file or email. "Organize" may be used to organize information pages as prior art "move" commands for organizing files or emails. "Find" may be used to find information pages as prior art "find" commands for finding files or emails. Each of these may be implemented in like manners as their prior art counterparts in the file subsystem or email context.

Figure 10:
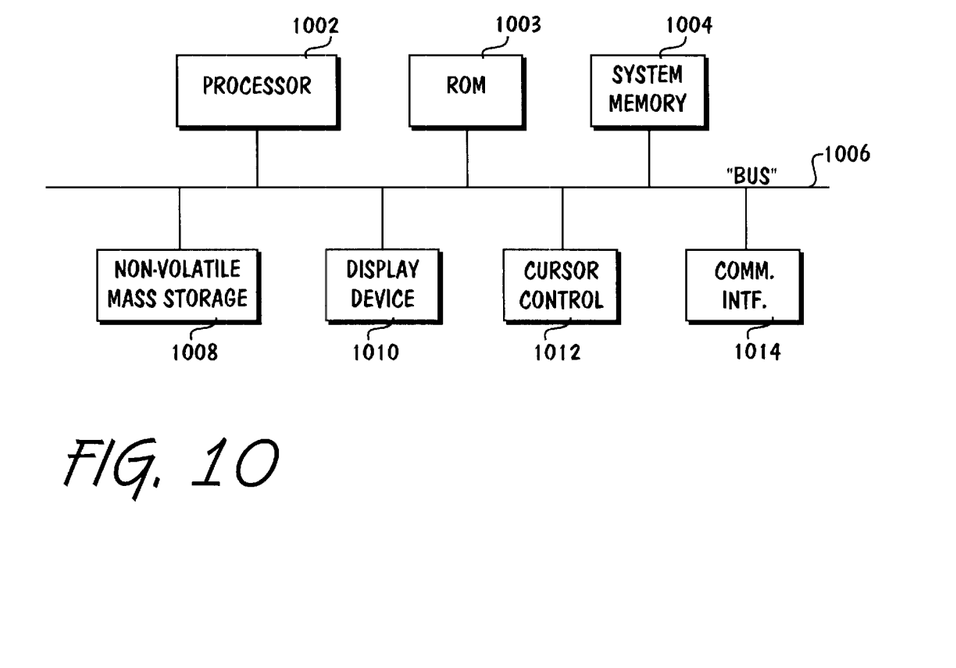
FIG. 10 illustrates a computer system suitable for use to practice the present invention, as either a client or a server, in accordance with one embodiment.

Referring now to FIG. 10, wherein a computer system suitable for use as either a client or a server to practice the present invention is shown. As shown, computer system 1000 includes processor 1002, ROM 1003, and system memory 1004 coupled to each other via "bus" 1006. Coupled also to "bus" 1006 are non-volatile mass storage 1008, display device 1010, cursor control device 1012 and communication interface 1014.

Except for the teachings of the present invention incorporated, each of these elements is intended to represent a wide range of these devices known in the art, and perform its conventional functions. For example, processor 1002 may be a processor of the Pentium® family available from Intel Corporation of Santa Clara, Calif., or a processor of the PowerPC® family available from IBM of Armonk, N.Y. Processor 1002 performs its conventional function of executing programming instructions, including those implementing the teachings of the present invention.

ROM 1003 may be EEPROM, Flash and the like, and memory 1004 may be SDRAM, DRAM and the like, from semiconductor manufacturers such as Micron Technology of Boise, Id. Bus 1006 may be a single bus or a multiple bus implementation. In other words, bus 1006 may include multiple buses of identical or different kinds properly bridged, such as Local Bus, VESA, ISA, EISA, PCI and the like.

Mass storage 1008 may be disk drives or CDROMs from manufacturers such as Seagate Technology of Santa Cruz, Calif., and the like. Typically, mass storage 1008 includes the permanent copy of browser 102, the repository manager and its managed repository, depending on whether computer system 1000 is used as a client or a server, and where the repository is located. The permanent copy of the browser and the repository manager may be installed in the factory, or in the field. For field installation, the permanent copy may be distributed using article of manufactures with recordable medium such as diskettes, CDROM, DVD and the like, or downloaded from a distribution server through a data network (such as the Internet). The distribution server may be a server of the OEM, i.e. the software developer, or a server of a publisher.

Display device 1010 may be monitors of any types from manufacturers such as Viewsonic of City, State. Cursor control 1012 may be a mouse, a track ball and the like, from manufacturers such as Logitech of Milpitas, Calif. Communication interface 1014 may be a modem interface, an ISDN adapter, a DSL interface, an Ethernet or Token ring network interface and the like, from manufacturers such as 3COM of San Jose, Calif.

Depending on whether computer system 1000 is used as a client or a server, one or more processor 1002 of less or more capability are employed. Likewise, smaller or larger system memory 1004 and mass storage 1008, as well as lower or higher performance "bus" 1006 and communication interface 1014 are employed.

As those skilled in the art will also appreciate, from the description the follow, the present invention may also be practiced without some of the enumerated elements, or with additional elements, such as graphics accelerators, audio and video add-on cards, and so forth.

Figure 11:
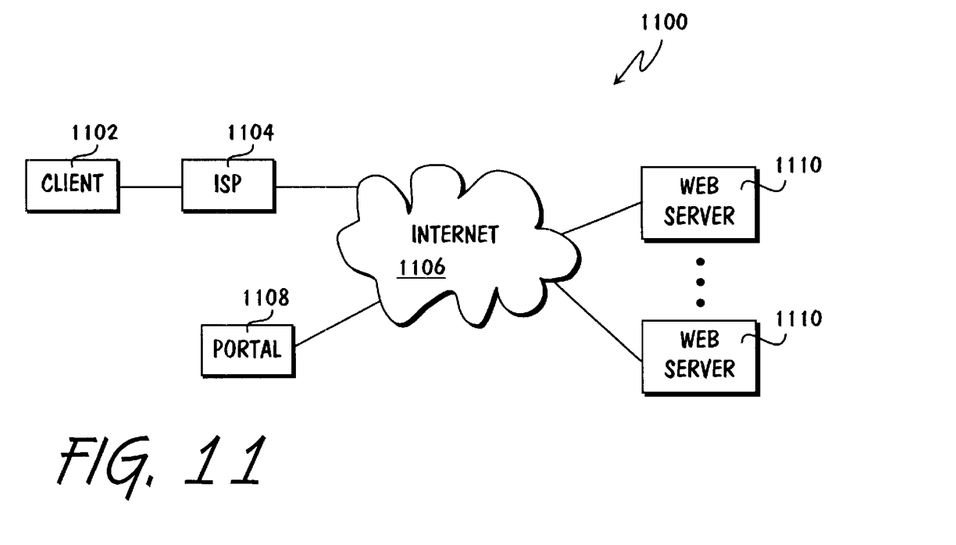
FIG. 11 illustrates a network environment suitable for practicing the present invention, in accordance with one embodiment.

FIG. 11 illustrates a network environment for practicing the present invention, in accordance with one embodiment. As illustrated, network 1100 includes client 1102, Internet Service Provider (ISP) 1104, portal 1108, and web servers 1110, coupled to each other through Internet 1106 as shown. Client 1102 is incorporated with the teachings of the present invention, i.e. enhanced browser 102 (with the above described scrapbook related functions), and the necessary underlying hardware and operating system functions. At least one of ISP 1104 or portal 1108 is incorporated with the complementary aspects of the teachings of the present invention, i.e. respository manager and the repository it manages for client 1102. Except for the teachings of the present invention, client 1102, ISP 1104, portal 1108, and web servers 1110, are intended to represent a broad range of these elements known in the art. While for ease of understanding, only one each for client 1102, ISP 1104 and portal 1108 is shown, as those skilled in the art will readily appreciate from the earlier description, the present invention may be practiced one or more client 1102, ISP 1104 and portal 1108.

Thus, a method and an apparatus for creating and maintaining a scrapbook of information pages have been described.

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A graphical user interface comprising:

a field to receive entry of a uniform resource locator for a web page to be retrieved for browsing by a user; and at least one other end user interface element to facilitate the user to electively saving at least the web page retrieved for user browsing into a scrapbook of the user;

wherein said at least one other end user interface element includes an icon having a plurality of manifestations corresponding to a plurality of states associated with said elective saving of a copy of the web page retrieved for user browsing, including a first manifestation denoting a copy of the web page retrieved for user browsing not having been previously saved, a second manifestation denoting at least a copy that is of a different version of the web page retrieved for user browsing having been previously saved, and a third manifestation denoting a copy of the web page retrieved for user browsing having been previously saved.

2. The graphical interface of claim 1, wherein the first manifestation of the first icon comprises a graphical image of a red scrapbook;

the second manifestation of the first icon comprises a graphical image of a yellow scrapbook; and the third manifestation of the first icon comprises a graphical image of a green scrapbook.

3. The graphical interface of claim 1, wherein the first icon is automatically displayed concurrent with the display of the web page retrieved for user browsing.

4. The graphical interface of claim 1, wherein said at least one other end user interface elements includes an icon to facilitate automatic saving of a copy of the web page retrieved for user browsing, into said scrapbook of the user, responsive to the user's selection of the icon, without requiring further interaction with the user.

5. The graphical interface of claim 1, wherein the graphical interface further comprises a mechanism to facilitate automatic retrieval of one or more web pages linked to the web page retrieved for user browsing, in accordance with one or more specified conditions, and saving the automatically retrieved linked web page(s) into said scrapbook of the user, without first downloading the linked web page(s) to a local host of the graphical interface, said scrapbook of the user being remotely disposed away from said local host.

6. The graphical interface of claim 5, wherein the graphical interface further comprises one or more mechanisms to facilitate specification of said one or more conditions.

7. A graphical interface comprising a field to receive entry of a uniform resource locator of a web page to be retrieved for user browsing; and a mechanism to facilitate automatic retrieval of one or more web pages linked with said web page retrieved for user browsing, in accordance with one or more specified conditions, and saving the automatically retrieved linked web page(s) into a scrapbook of the user, without first downloading the linked web page(s) to a local host of the graphical interface, said scrapbook of the user being remotely disposed away from the local host.

8. A graphical interface comprising a field to receive entry of a uniform resource locator of a web page to be retrieved for browsing by a user; and a plurality of end user interface elements to facilitate the user to electively saving at least the web page retrieved for user browsing into a scrapbook of the user, including a first icon having a plurality of manifestations corresponding to a plurality of states associated with saving a copy of the web page retrieved for user browsing; and a second icon to facilitate automatic saving of a copy of the web page retrieved for user browsing, into said scrapbook of the user, responsive to a user's selection of the second icon, without requiring further interaction with the user.

9. The graphical interface of claim 8, wherein the graphical interface further comprises a mechanism to facilitate automatic retrieval of one or more web pages linked with said web page retrieved for user browsing, in accordance with one or more specified conditions, and saving the automatically retrieved linked web pages into said scrapbook of the user, without first downloading the linked web pages to a local host of the graphical interface, said scrapbook of the user being remotely disposed away from the local host.

10. A graphical interface comprising
a field to receive entry of a uniform resource locator of a web page to be retrieved for browsing by a user; and
a plurality of end user interface elements to facilitate the user to electively saving at least the web page retrieved for user browsing into a scrapbook of the user, including
a first icon having a plurality of manifestations corresponding to a plurality of states associated with saving a copy of the web page retrieved for user browsing; and
a mechanism to facilitate automatic retrieval of one or more web pages linked with the web page retrieved for user browsing in accordance with one or more specified conditions, and saving the automatically retrieved linked web pages into said scrapbook of the user, without first downloading the linked web pages to a local host of the graphical interface, said scrapbook of the user being remotely disposed away from the local host.

11. A graphical interface comprising
a field to receive entry of a uniform resource locator of a web page to be retrieved for browsing by a user; and
a plurality of end user interface elements to facilitate the user to electively saving at least the web page retrieved for user browsing into a scrapbook of the user, including
a first icon to facilitate automatic saving of the web page retrieved for user browsing, into said scrapbook of the user, responsive to the user's selection of the first icon, without requiring further interaction with the user; and
a mechanism to facilitate automatic retrieval of one or more web pages linked with the web page retrieved for user browsing, in accordance with one or more specified conditions, and saving the automatically retrieved linked web page(s) into said scrapbook of the user, without first downloading the web page(s) to a local host of the graphical interface, said scrapbook of the user being remotely disposed away from the local host.

12. In a client apparatus, a method comprising:
displaying a first icon in a selected one of a plurality of manifestations corresponding to a plurality of states associated with saving a copy of a current web page retrieved for user browsing, to inform a user of the current state with respect to saving the web page retrieved for user browsing in a scrapbook of the user;

displaying a second icon associated with user elective saving of a copy of the current web page retrieved for user browsing into said scrapbook of the user; and automatically causing a copy of the current web page retrieved for user browsing to be saved into said scrapbook of the user, responsive to the users selection of the second icon, without requiring further interaction with the user.

13. The method of claim 12, wherein said plurality of manifestations of the first icon comprise at least one of the manifestations selected from a group consisting of a first manifestation denoting a copy of the current web page retrieved for user browsing not having been previously saved, a second manifestation denoting at least a copy that is of a different version of the current web page retrieved for user browsing having been previously saved, and a third manifestation denoting a copy of the current web page retrieved for user browsing having been previously saved.

14. The method of claim 13, wherein
the first manifestation of the first icon comprises a graphical image of a red scrapbook;
the second manifestation of the first icon comprises a graphical image of a yellow scrapbook; and
the third manifestation of the first icon comprises a graphical image of a green scrapbook.

15. The method of claim 12, wherein the first icon is automatically displayed concurrent with the display of the current web page retrieved for user browsing.

16. The method of claim 12, wherein said scrapbook of the user is disposed in a selected one of a local repository and a remote repository.

17. The method of claim 12, wherein said method further comprises responsive to the user's instruction, automatically causing one or more web pages linked with the current web page retrieved for user browsing to be retrieved in accordance with one or more specified conditions, and saved into said scrapbook of the user, without requiring the linked web pages to be first downloaded into the client apparatus, said scrapbook of the user being remotely disposed away from said client apparatus.

18. The method of claim 17, wherein the method further comprises facilitating the user in specifying said one or more conditions.

19. In a server computer, a method of operation on said server computer, the method comprising:
receiving from a remote client, a uniform resource locator identifying a current web page being browsed at the remote client by a user;
determining a current state associated with saving a copy of the current web page being browsed on said remote client, in a scrapbook of the user remotely disposed away from said remote client; and
informing the remote client the determined current state to facilitate concurrent display of a first icon with the current web page being browsed on the client, denoting for the user of the remote client the current state associated with saving a copy of the current web page being browsed in said remotely disposed scrapbook of the user.

20. The method of claim 19, wherein the method further comprises
receiving an instruction from the remote client; and
in response, causing a copy of the current web page being browsed on the remote client to be retrieved and saved into the remotely disposed scrapbook of the user.

21. The method of claim 19, wherein the method further comprises receiving an instruction including one or more conditions from the remote client; and in response, causing a copy each for one or more web pages linked with the web page being browsed on the remote client to be retrieved in accordance with the one or more conditions, and saved into the remotely disposed scrapbook of the user, without requiring the linked web page(s) to be first downloaded to the remote client.

22. In a server computer, a method of operation on the server computer, the method comprising:

receiving from a remote client, an instruction including a uniform resource locator for a current web page being browsed on the remote client by a user of the remote client;

in response, causing a copy of the current web page being browsed on the remote client by the user of the remote client to be retrieved, using said included uniform resource locator, and saved into a scrapbook of the user remotely disposed away from the remote client, receiving from the remote client, an instruction including one or more conditions from the remote client; and in response, causing a copy each for one or more web pages linked with the web page being browsed on the remote client by the user of the remote client, to be retrieved in accordance with the one or more conditions, and saved into the remotely disposed scrapbook, without requiring the linked web page(s) to be first downloaded to the remote client.

23. In a server computer, a method of operation on the server computer, the method comprising:

receiving an instruction including one or more conditions from a remote client; and in response, causing a copy each for one or more web pages linked with one or more web pages being browsed on the remote client by a user of the remote client, to be retrieved in accordance with the one or more conditions, and saved into scrapbook of the user remotely disposed away from the remote client, without requiring the linked web page(s) to be first downloaded to the remote client.

24. An apparatus comprising:

a processor; and a storage medium having stored therein a plurality of programming instructions to be executed by the processor, wherein when executed, the programming instructions cause a first icon in a selected one of a plurality of manifestations to be displayed, the manifestations corresponding to a plurality of states associated with saving into a scrapbook of a user of the apparatus, a copy of a current web page retrieved for browsing by the user, to inform the user of a current state associated with said saving of the current web page in said scrapbook of the user, a second icon to be displayed, the second icon being associated with saving a copy of said current web page retrieved for browsing by the user into said scrapbook of the user, and in response to the user's selection of the second icon, a copy of the current web page retrieved for browsing by the user to be saved into said scrapbook of the user, without requiring further interaction with the user.

25. The apparatus of claim 24, wherein the programming instructions, in response to the user's instruction, further cause one or more web pages linked with the current web page retrieved for browsing by the user, to be retrieved in accordance with one or more specified conditions, and saved into said scrapbook of the user, without requiring the linked web pages to be first downloaded into the apparatus, said scrapbook of the user being remotely disposed away from the apparatus.

26. An apparatus comprising:

a processor; and a storage medium having stored therein a plurality of programming instructions to be executed by the processor, wherein when executed, the programming instructions in response to a first user instruction, cause a copy of a current web page retrieved for browsing by a user of the apparatus, to be automatically saved into a scrapbook of the user remotely disposed away from the apparatus, without requiring further interaction with the user, and in response to a second user instruction, cause one or more web pages linked with the web page retrieved for browsing by the user, to be retrieved in accordance with one or more specified conditions, and saved into the remotely disposed scrapbook of the user, without first downloading the linked web pages to the apparatus.

27. A computer system comprising:

a processor; and a storage medium having stored therein a plurality of programming instructions to be executed by the processor, wherein when executed, the programming instructions receive from a remote client, a uniform resource locator identifying a current web page retrieved for browsing at the remote client by a user of the remote client, determine a current state associated with saving a copy of the current web page being browsed by the user of the client in a scrapbook of the user remotely disposed away from the client; and inform the remote client the determined current state to facilitate concurrent display on the client, a first icon with the current web page retrieved for browsing by the user of the remote client, denoting for the user of the remote client, the current state associated with saving a copy of the current web page in the remotely disposed scrapbook of the user.

28. The computer system of claim 27, wherein when executed, the programming instructions further receive an instruction from the remote client; and in response, cause a copy of the current web page being browsed by the user of the remote client on the remote client to be retrieved and saved into the remotely disposed scrapbook of the user.

29. The computer system of claim 27, wherein when executed, the programming instructions further receive an instruction including one or more conditions from the remote client, and in response, cause a copy each for one or more web pages linked with the web page being browsed by the user of the remote client on the remote client, to be retrieved in accordance with the one or more conditions, and saved into the remotely disposed scrapbook of the user, without requiring the linked web page(s) to be first downloaded to the remote client.

30. A computer system comprising:

a processor; and a storage medium having stored therein a plurality of programming instructions to be executed by the processor, wherein when executed, the programming instructions receive from a remote client, an instruction including a uniform resource locator for a current web page being browsed on a remote client by a user of the remote client, in response, cause a copy of the current web page retrieved for browsing by the user of the remote client on the remote client, to be retrieved and saved into a scrapbook of the user remotely disposed away from the remote client, receive an instruction including one or more conditions from the remote client, and in response, cause a copy each for one or more web pages associated with the web page being browsed by the user of the remote client on the remote client, to be retrieved in accordance with the one or more conditions, and saved into the remotely disposed scrapbook, without requiring the linked web page(s) to be first downloaded to the remote client.

31. A computer system comprising:

a processor; and a storage medium having stored therein a plurality of programming instructions to be executed by the processor, wherein when executed, the programming instructions enable the computer system to receive an instruction including one or more conditions from a remote client; and in response, causing a copy each for one or more web pages associated with a web page retrieved for browsing on the remote client by a user of the remote client, to be retrieved in accordance with the one or more conditions, and saved into a scrapbook of the user remotely disposed away from the remote client, without requiring the linked web page(s) to be first downloaded to the remote client.

* * * * *